United States Patent [19]

Abbott

[11] Patent Number: 4,598,550

[45] Date of Patent: Jul. 8, 1986

[54] RADIANT HEAT ENGINE

[76] Inventor: John A. Abbott, 151 Mimosa Way, Menlo Park, Calif. 94025

[21] Appl. No.: 679,643

[22] Filed: Dec. 10, 1984

[51] Int. Cl.⁴ ............................. F03G 7/02; F03G 7/06
[52] U.S. Cl. ...................................... 60/641.8; 60/527
[58] Field of Search ................... 60/527, 641.8, 641.15

[56] References Cited

U.S. PATENT DOCUMENTS

| | | | |
|---|---|---|---|
| 3,913,326 | 10/1975 | Banks | 60/527 |
| 4,006,594 | 2/1977 | Horton | 60/641 |
| 4,037,411 | 7/1977 | Hochstein | 60/527 |
| 4,055,956 | 11/1977 | Matovich | 60/527 |
| 4,075,847 | 2/1978 | Ray | 60/527 |
| 4,236,377 | 12/1980 | Weinert | 60/641 |
| 4,307,571 | 12/1981 | Jackson | 60/641.15 |
| 4,337,622 | 7/1982 | Johnson | 60/641.13 |

*Primary Examiner*—Allen M. Ostrager

[57] ABSTRACT

An engine powered by radiant thermal energy wherein elongated thermally expandable members are tensioned radially out from a centrally located floating bearing to which the converging ends of the tension members are secured. The floating bearing encloses an eccentric section of a crankshaft with axis parallel to rays from the energy source and perpendicular to the plane of the tension members. The crankshaft has mounted thereto means for shading at any one time some but not all of said tension members from the energy source. The arrangement is such that when the engine is first exposed to the energy source with crankshaft axis pointing at the source expansion of the unshaded tension members results in an imbalance of the forces on the floating bearing and hence the crankshaft, causing the crankshaft and shade mounted thereto to begin to rotate. As the tension members are thus sequentially shaded from and exposed to the energy source by rotation of the shade means the floating bearing is subjected to a continuing imbalance of forces, causing the crankshaft and shade to rotate as long as the engine is exposed to an energy source of sufficient intensity.

10 Claims, 13 Drawing Figures

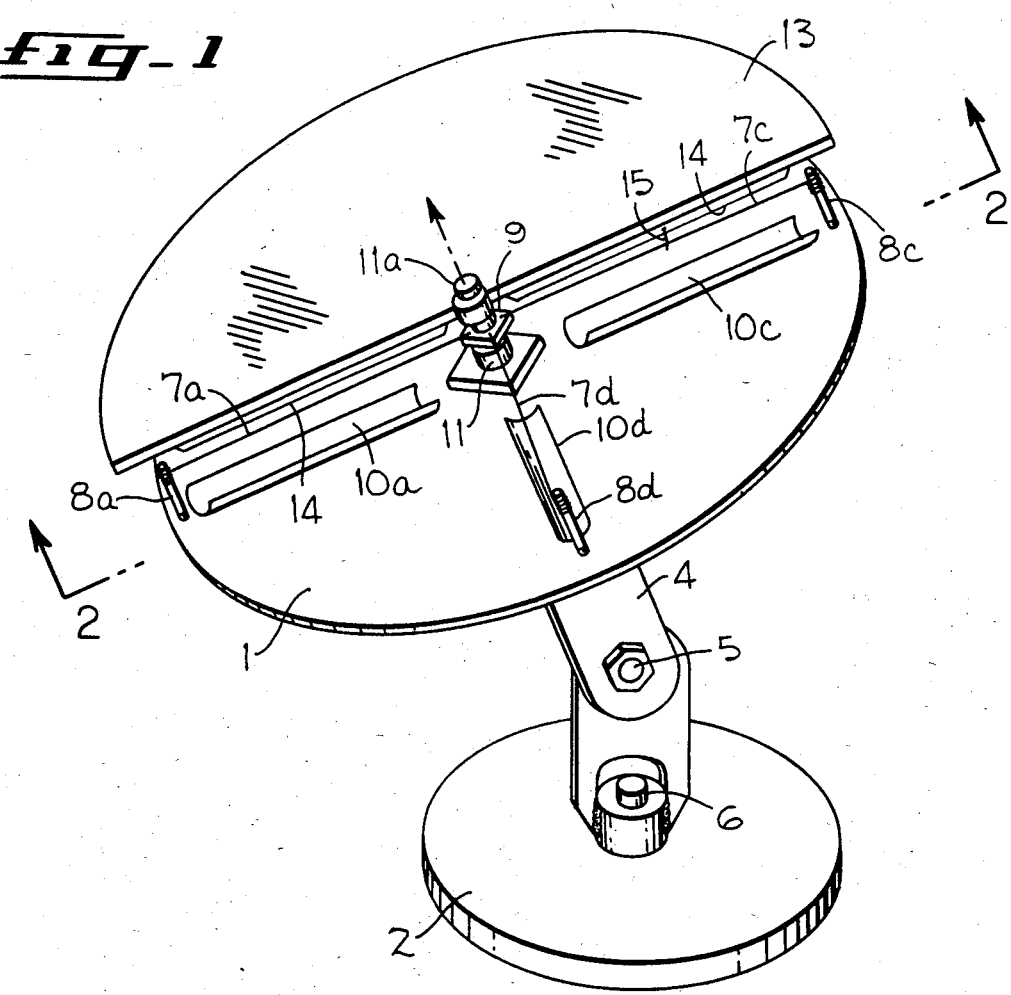
fig_1
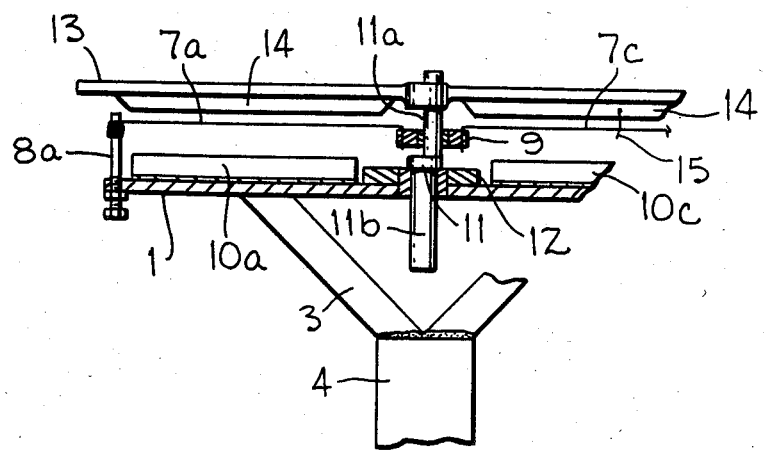
fig_2

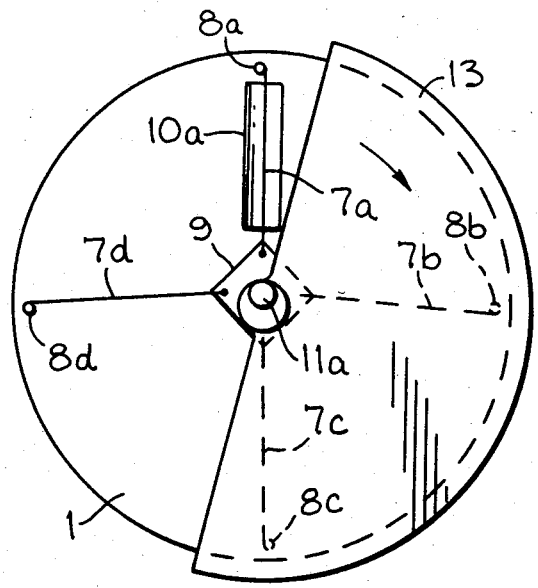
fig_3A
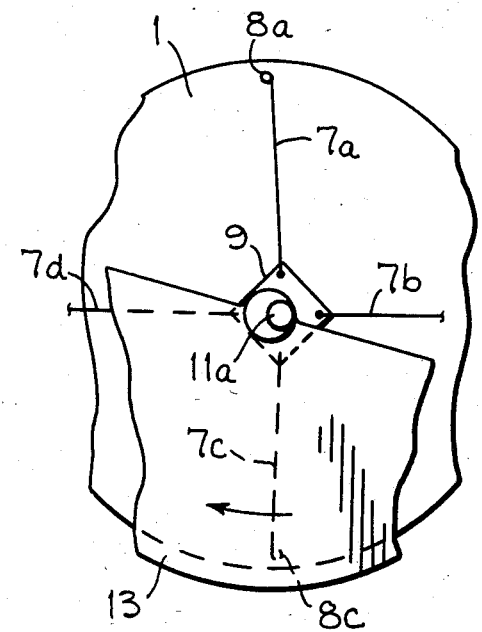
fig_3B
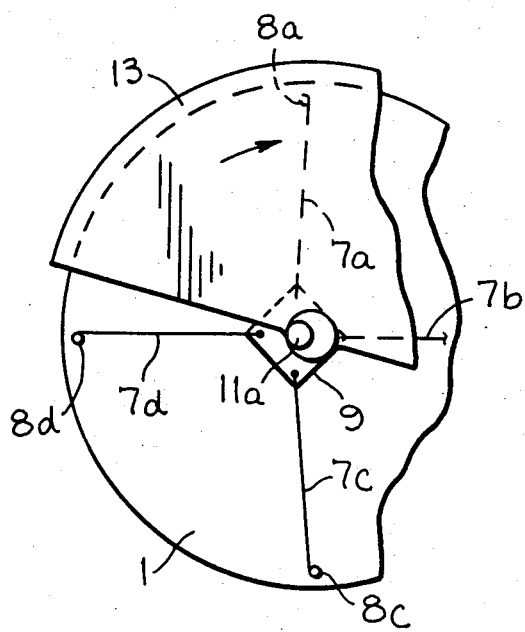
fig_3D
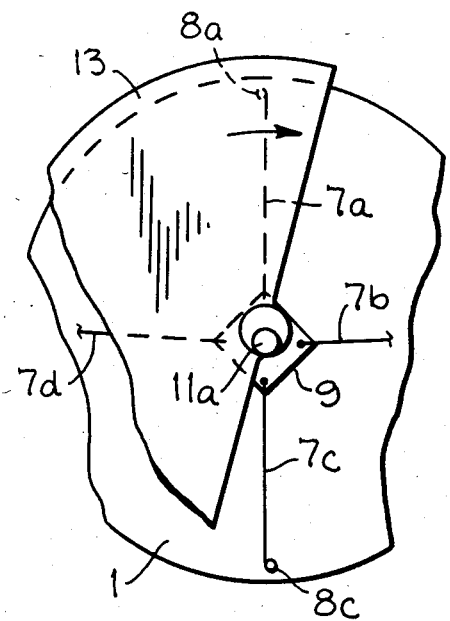
fig_3C

RADIANT HEAT ENGINE

BACKGROUND OF THE INVENTION

1. Field of the Invention

The present invention relates to radiant heat engines and more particularly relates to solar engines which utilize thermally expandable tension members which alternately receive and are shaded from heat energy for converting thermal energy into motion.

2. Description of the Prior Art

Most devices to convert radiant heat energy directly into motion operate on one of two general principles. By the first principle, the radiant energy heats a suitable working fluid in a confining chamber. The heated fluid expands, exerting increased pressure on the inside of the chamber and on a piston integral with the chamber, moving the piston and thus producing motion. In an alternate arrangement the expanding fluid may impinge on a turbine blade, moving the blade and producing motion. In a continuous cycle operating on this principle the working fluid, after being cooled by expanding and moving the piston or turbine blade, is again heated by the radiant energy, and the cycle continues.

By the second principle radiant energy is absorbed in certain solid materials known as photovoltaic materials, which convert the radiant energy directly into electric current capable of doing work through a suitable electric motor.

SUMMARY OF THE INVENTION

Thermally expandable tension members are arranged to receive radiated heat energy (as from the sun) and, through their expansion on receipt of the energy, and contraction on discharge of the energy, to convert the thermal energy into motion, as long as the device is exposed to a heat source of sufficient intensity. From this point on, the terms "radiant heat source" and "sun" will be used interchangeably. Likewise, the terms "energy" and "heat" will be used interchangeably.

BRIEF DESCRIPTION OF THE DRAWINGS

FIG. 1 is an isometric view of the preferred embodiment of the invention, involving crankshaft motion.

FIG. 2 is a partial cross section taken along line 2—2 of FIG. 1 showing details of construction.

FIGS. 3A through 3D are progressive operational views, showing how rotary motion is imparted to a crankshaft by sequential expansion and contraction of the tension members.

DESCRIPTION OF THE PREFERRED EMBODIMENT

Figure 4A:
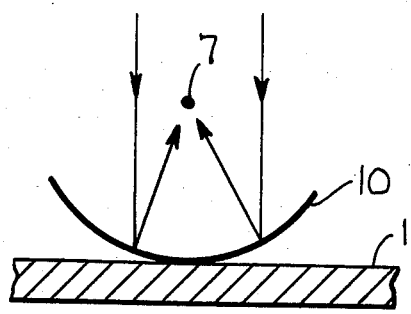
FIG. 4A is a cross sectional detail of a tension member, a reflector, and a section of a base plate, showing how heat energy is concentrated on a tension member by a reflector.

Looking first at FIGS. 1 and 2, a supporting plate 1 mounted tiltably and rotatably on a base 2 provides support for other members shown. The plate 1 is fixed on its underside to structural members 3 and 4, so that a pin joint 5 in member 4 provides means for holding plate 1 at a fixed angle to the horizontal, after it is manually tilted, and swivel joint 6 provides means for rotating the plate about a vertical axis. A plurality of tension members 7a, 7b, 7c, etc. (only four members being illustrated) are tensioned between screw supports 8a–8d at the outer edge of support plate 1, and floating bearing 9 near the center, so that said tension members extend radially from floating bearing 9 in a plane perpendicular to rays of thermal energy from the sun. Reflectors 10a–10d are mounted under tension members 7 to concentrate heat energy on the tension members. Said reflectors are each preferably of parabolic cross section and of elongated shape, running with long dimension parallel to the associated tension member.

Floating bearing 9 encloses an eccentric crank arm 11a of a crankshaft 11, said crankshaft being held rotatably by its lower concentric section 11b in a position perpendicular to support plate 1, tension members 7, and reflectors 10, leaving crankshaft 11 free to rotate in response to expansion and contraction of tension members 7. Means for holding crankshaft 11 rotatably is provided by bearing 12 fixed to support plate 1.

A shade 13 of semi-circular outline is mounted near the center of its diameter to an extended section of crankshaft 11a and rotates with the crankshaft, alternately exposing and shading tension members to/from the sun. As the crankshaft 11 is thus rotated by thermal energy from the sun, useful work may be taken from the exposed bottom end of the crankshaft 11b, by means well known in the mechanical engineering art. Whereas the shade is in the form of a half-circle, it may be in the shape of any other segment of a circle, to give the proper ratio between heating time and cooling time for tension members 7.

Now turning to FIG. 3 A, B, C, and D, the principle of motion of this preferred embodiment will be explained.

In FIG. 3A the engine is shown in substantially plan view with the axis of the crankshaft pointing at the sun, just prior to exposure to the sun. The crankshaft and shade are at rest, since the system is in equilibrium, and the straight edge of the shade is at an angle of a few degrees with tension members 7a and 7c. However, it will be understood that the shade can be at any point in its rotational path at the start of operation. In FIG. 3A, tension members 7b and 7d are of equal length and subject to equal tensional stresses. (In assembling the apparatus, the tension of each tension member 7 is adjusted by turning screw 8 to be the same as those of members 7b and 7d, as shown in FIG. 3A). In FIG. 3A, tension member 7a is at its minimum length and tensile stress, and tension member 7c is at its maximum stress.

When the apparatus is exposed to the sun and the support plate 1 is tilted and rotated manually so that the axis of the crankshaft points at the sun, tension members 7b and 7c, being shielded from the sun by shade 13, do not change in temperature or stress. But tension members 7d and 7a, being exposed to the sun, and having the sun's rays concentrated on them by reflectors 10 (only one shown), rise in temperature, tending to expand, and are thus subject to reduced stress. This causes an imbalance of forces on floating bearing 9, causing it to begin to move clockwise around the center of crankshaft 11. Just after this motion commences, and the crank arm 11a moves clockwise off the equilibrium position relative to tension members 7a and 7c, the relatively high stresses in tension members 7b and 7c are applied eccentrically, aiding in clockwise rotation of crankshaft 11.

FIG. 3B shows the condition after the crankshaft 11 has rotated shade 13 about 90 degrees clockwise from its position in FIG. 3A. Tension member 7a, still exposed to the sun, is at a lower stress level than member 7c, still shaded, hence the force imbalance favors clockwise motion of crankshaft 11. Tension members 7b and 7d are directly opposed and on "dead center" with member 7b now exposed and commencing to rise in temperature, and tension member 7d now shaded and beginning to cool.

FIG. 3C shows the condition after crank shaft 11 has rotated 180 degrees clockwise from its position in FIG. 3A. In this position, tension member 7d is cooling, exerting a higher tensile stress than tension member 7b (of the same length at this point), thus sustaining clockwise motion of crankshaft 11. Tension members 7a and 7c are directly opposed, with member 7c now exposed and beginning to warm, and tension member 7a now shielded and beginning to cool.

In FIG. 3D, tension member 7a, now cooler and at higher stress than member 7c, supplies clockwise rotational force, while tension members 7b and 7d are directly opposed. When the crankshaft 7a has rotated another 90 degrees from its position in FIG. 3D it will again be in the position shown in FIG. 3A, and the rotation cycle will continue.

Although only four tension members 7 are shown, it will be easily understood that a large plurality of tension members may be used, extending radially from floating bearing 9 to support screws 8 at the periphery of support plate 1, so as to collect more heat from the sun, and produce more work in the form of mechanical motion.

Figure 6:
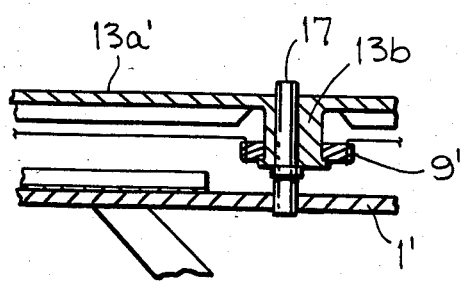
FIG. 6 is a partial cross section showing an alternate embodiment to that shown in FIG. 2.

Another embodiment is shown in FIG. 6. Shaft 17 may replace the crankshaft 11 of FIG. 2, and may be fixed to support plate 1 and be straight throughout its length, while shade 13a' has a cylindrical downward extension 13b, eccentric with respect to shade 13a', rotatably fitted onto shaft 17. Floating bearing 9' encloses said eccentric shade section 13a', which extension rotates in floating bearing 9', causing the entire shade to rotate with the same action, otherwise, as previously disclosed.

Figure 7A:
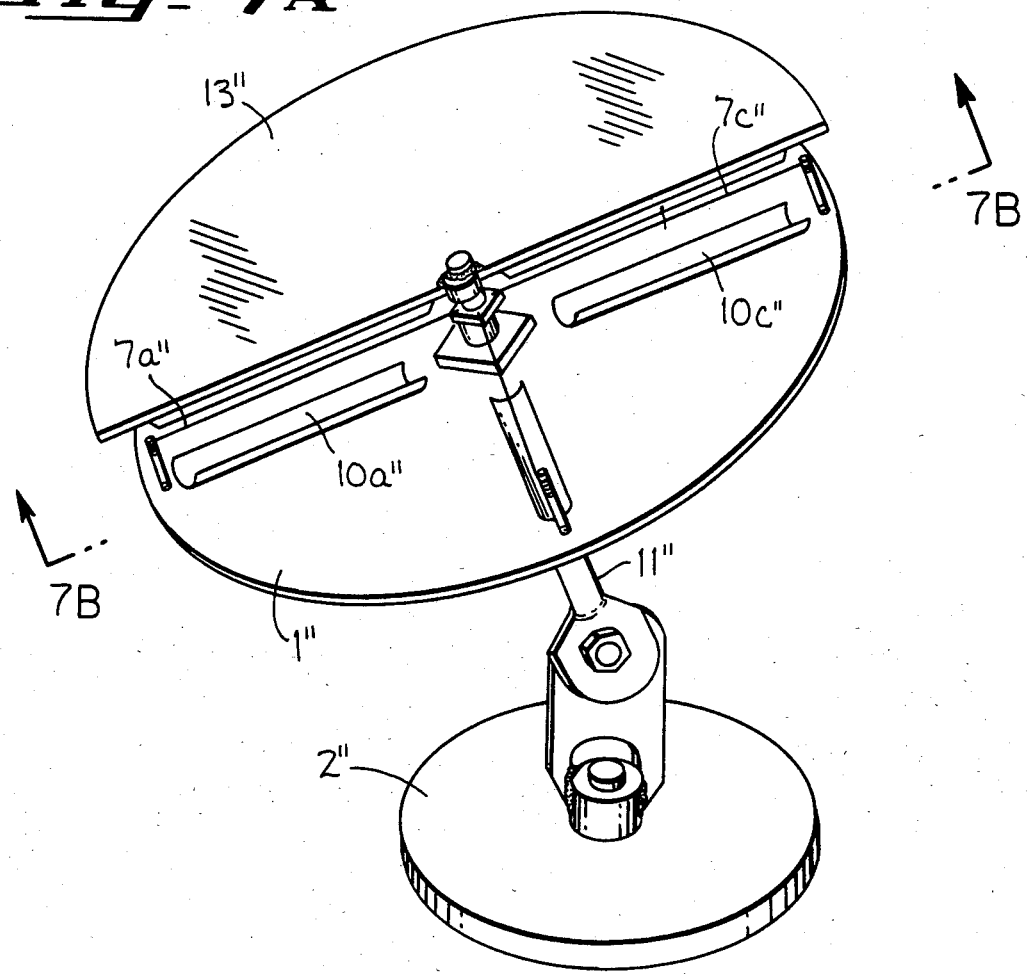
FIG. 7A is an isometric view of an alternate embodiment to that shown in FIG. 1.
Figure 7B:
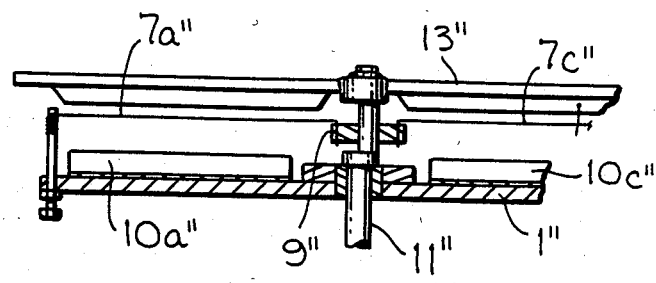
FIG. 7B is a section taken along lines 7B—7B of FIG. 7A.

In another workable embodiment shown in FIGS. 7A and 7B, construction is similar to that shown in FIGS. 1 and 2, with the exception that crankshaft 11″ and shade 13″ are stationary during operation of the engine, and support plate 1″ containing tension members 7a″–7d″ and reflectors 10a″–10d″ rotates around the crankshaft 11″. In this embodiment, the crankshaft 11″ extends downward and is connected to the base 2″, providing support for other members shown.

While not essential to the basic invention, there are certain enhancements that improve the action of the solar engine in certain applications, which enhancements will easily be understood by those skilled in mechanical engineering crafts.

Referring to FIGS. 1 and 2, during the part of the rotation cycle in which a tension member is shaded, cooling takes place largely by conduction of heat to the ambient air. Cooling rate may be increased by provision of fins 14 attached to shade 13, said fins extending radially out from the center of shade 13, in a vertical plane, with their lower edges coming near tension members 7a–7d as shade 13 rotates, so that the fins produce a fanning action to hasten cooling of tension members 7a–7d.

Cooling rate may also be increased by provision of reeds 15 attached to shade 13 or fins 14, to pluck each tension member 7 causing it to vibrate during the cooling cycle.

Tension members can be of any material capable of withstanding tensile stress, and having a positive coefficient of thermal expansion. Relatively small diameter steel wire is one good material. Small diameter promotes a more rapid cycling of the engine, as the smaller the wire, the faster its temperature responds to the alternate heating and cooling effect. However, the tension member may be in the form of a thin, flat ribbon, with its broad side exposed to the heat source, so as to capture a higher amount of heat energy.

If the tension member is metal, the surface may be altered if necessary so as to increase thermal absorptivity, bright metal being known to have low absorptivity. One good method for increasing the absorptivity of steel is to treat the surface of the steel with chemical "gun bluing" solution.

It is well known that different metallic alloys exibit differing degrees of thermal expansion ability. For tension members, metals with relatively high coefficients are preferred, other characteristics being acceptible.

Reflectors 10 (FIG. 4A) should preferably be parabolic in cross section with tension members being located along the focus line of the parabola. For economy in manufacture, however, the cross section of reflectors may be circular, with only moderate decrease in effectiveness.

Figure 4B:
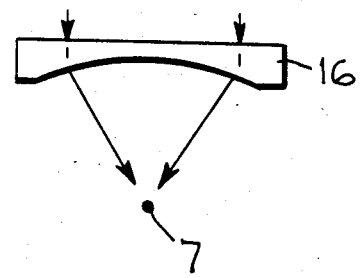
FIG. 4B is similar to FIG. 4A, but shows a lens as the radiant heat energy concentrating device.

If preferred, lenses 16 (FIG. 4B) may be used to concentrate energy on tension members 7a–7d instead of reflectors.

Figure 5B:
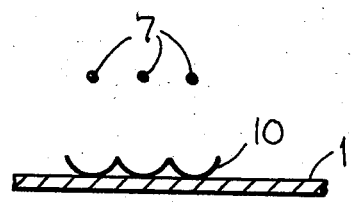
FIG. 5B is section taken along lines 5B—5B of FIG. 5A.
Figure 5A:
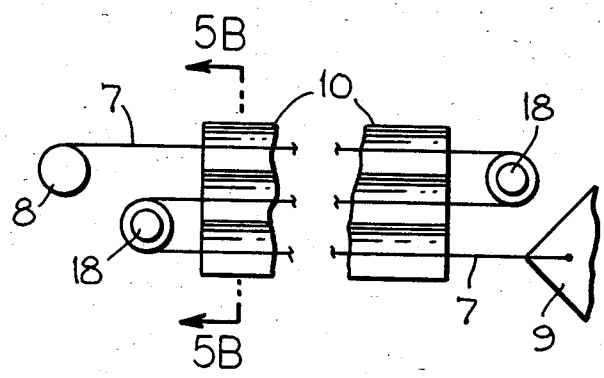
FIG. 5A is a plan view with parts cut away illustrating three sections of a tension member folded between sheaves, a three-section reflector, and a support plate.

To provide a longer "stroke" in the operation of crankshaft 11 (FIG. 1), tension members 7 may be provided in longer length relative to the dimensions of the support plate 1. This can be done by passing each tension member 7 around one or more sheaves 18 in between pin 8 and floating bearing 9, as shown in FIG. 5A. In this arrangement a reflector 10 comprising two or more sections (three shown in FIG. 5A) is used. The arrangement of the three-section reflector 10 with the sections of the tension member 7 is shown in FIG. 5B, which is a cross section taken along line 5B—5B of FIG. 5A.

Thus, in this invention, tension members each having one end secured to a immovable support, have their other ends secured to a machine member that is free to move in the plane of the tension members, in response to expansion and contraction of said tension members. The tension members, in their motion thus induced, operate a shading device to alternately expose each said tension member to the sun, then shade said tension member from the sun, in a repeating cycle. Thus the alternate exposing and shading of the tension members causes the expansion and contraction of said members, which in turn powers the mechanism for said alternate exposing and shading, resulting in continuous motion as long as said radiant heat is supplied.

In the preferred embodiment, the staged, sequential expansion and contraction of a plurality of tension members imparts a continuous circular motion to a floating shaft-bearing mounted on the eccentric section of a crankshaft. Said tension members, said shaft bearing, and said circular motion are in a plane perpendicular to the axis of the crankshaft, and the amplitude of motion of the floating bearing can accomodate the "throw" of the crankshaft. Thus said circular motion causes the crankshaft to rotate. A shading screen of suitable shape is mounted on an upper extension of the crankshaft and rotates with the crankshaft in a plane parallel to the plane of the tension members, alternately exposing and shielding said tension members to/from the sun. Thus said rotary motion is continuous as long as the complete assembly is exposed to sunlight of sufficient intensity.

What is claimed is:

1. An engine powered by radiant heat energy, comprising means defining a radiant heat energy shade, a plurality of thermally expandable tension members, an immovable support, a shade operating mechanism for alternately removing and repositioning said shade, said tension members each having one end secured to said immovable support and the other end secured to said mechanism for alternately removing then repositioning said shade means between a radiant heat source and each said tension member causing said tension member to expand and contract as it is alternately heated by said source and then permitted to cool when the shade means is repositioned, said expansion and contraction of said tension members thus supplying at least the motive force for operation of the shade.

2. An engine as in claim 1, wherein said shade-operating mechanism includes a floating bearing, said immovable support, a crankshaft with one concentric end rotatably mounted in said immovable support, means defining a middle eccentric section on said shaft contained in said floating bearing, said floating bearing having fixed thereto one portion of said tension members causing the bearing to move in a circle in a plane perpendicular to the crankshaft axis by sequential expansion and contraction of said tension members causing the crankshaft to rotate and, said shade means being connected to said crankshaft providing at least the motive force to remove and reposition said shade means between said tension members and said energy source.

3. An engine as in claim 2 wherein such immovable support comprises a plate supported approximately perpendicular to incoming rays from said heat source which provides support for said crankshaft near the center of said plate and provides support for another portion of said tension members near the outer edge of said plate.

4. An engine powered by radiant heat energy, comprising an immovable support plate oriented approximately perpendicular to incoming rays from a radiant heat source, a crankshaft located at or near the center of said support plate having a longitudinal axis perpendicular to said support plate, a concentric end of said crankshaft rotatably supported by said support plate, an eccentric on said crankshaft, a floating bearing journaled on said eccentric, another end of said crankshaft extending toward the energy source and constituting a crankshaft extension, a plurality of elongated tension members aligned in or near a plane parallel to said support plate, each tension member having one end secured to said floating bearing, each of said tension members extending radially out from said longitudinal axis with the other end of said tension member secured to said support plate, means defining a shade secured to said crankshaft extension and having a shape such that, as it rotates with the crankshaft, said shade means alternately shields said tension members from and exposes said tension members to the radiant energy source.

5. An engine according to claim 4 and additionally comprising reflectors placed on said support plate near each said tension member for concentrating rays of energy on said tension members.

6. An engine as in claim 4, and additionally comprising a sheave or sheaves journalled on said support plate remote from said floating bearing to define at least one tension member fold point, wherein each tension member is provided in increased length relative to said base plate dimensions by arranging said tension member to include two or more passes between said bearing and said support plate with the tension member supported at its fold points by said sheave or sheaves.

7. An engine as in claim 4, and additionally comprising a radiant energy concentrating lens placed between said tension member and the radiant heat source, for concentrating additional energy on said tension member.

8. An engine as in claim 4, and additionally comprising fins which extend from said shade means in a direction away from said energy source and toward said tension members, for fanning said tension members and increasing the cooling rate during the shaded part of the cycle.

9. An engine as in claim 4, and additionally comprising reeds extending from said shade means to pluck said tension members causing said members to vibrate during the shaded part of the cycle thereby increasing their cooling rate.

10. An engine as in claim 1 wherein said shade operating mechanism additionally comprises a floating bearing, means defining a cylindrical extension from near the center of said shade extending perpendicularly in the direction of said tension members, said cylindrical extension contained within said floating bearing, a immovable support, a shaft with one end secured to said immovable support and the other end rotatably and eccentrically mounted in said shade extension, said floating bearing having fixed thereto one portion of said tension members causing the bearing to move in a circle in a plane perpendicular to said shaft axis by sequential expansion and contraction of said tension members causing said cylindrical shade extension and shade means to rotate on said shaft, providing at least the motive force to remove and reposition said shade means between said tension members and said energy source.

* * * * *